(12) United States Patent
Zhang et al.

(10) Patent No.: US 8,196,053 B2
(45) Date of Patent: Jun. 5, 2012

(54) DOCUMENT TREATMENT ICON

(75) Inventors: Paul Y. Zhang, Centerville, OH (US);
Thomas J. Goedde, Piqua, OH (US)

(73) Assignee: LexisNexis, Miamisburg, OH (US)

( * ) Notice: Subject to any disclaimer, the term of this patent is extended or adjusted under 35 U.S.C. 154(b) by 689 days.

(21) Appl. No.: 12/320,282

(22) Filed: Jan. 22, 2009

(65) Prior Publication Data
US 2010/0185962 A1    Jul. 22, 2010

(51) Int. Cl.
*G06F 3/048* (2006.01)
(52) U.S. Cl. ......... 715/763; 715/764; 715/765; 715/810
(58) Field of Classification Search .................. 715/764, 715/763, 765, 810
See application file for complete search history.

(56) References Cited

U.S. PATENT DOCUMENTS

| | | | | |
|---|---|---|---|---|
| 5,708,825 A * | 1/1998 | Sotomayor | ............. | 715/205 |
| 5,815,392 A * | 9/1998 | Bennett et al. | ............. | 705/311 |
| 5,870,770 A * | 2/1999 | Wolfe | ............. | 715/805 |
| 5,991,755 A * | 11/1999 | Noguchi et al. | ............. | 1/1 |
| 6,038,574 A * | 3/2000 | Pitkow et al. | ............. | 715/210 |
| 6,289,342 B1 * | 9/2001 | Lawrence et al. | ............. | 1/1 |
| 6,952,806 B1 * | 10/2005 | Card et al. | ............. | 715/802 |
| 7,117,443 B1 * | 10/2006 | Zilka et al. | ............. | 715/739 |
| 7,194,691 B1 * | 3/2007 | Zilka et al. | ............. | 715/739 |
| 7,529,756 B1 * | 5/2009 | Haschart et al. | ............. | 1/1 |
| 7,844,899 B2 * | 11/2010 | Boucher | ............. | 715/266 |
| 2002/0091679 A1 | 7/2002 | Wright | | |
| 2005/0149343 A1 | 7/2005 | Rhoads et al. | | |
| 2006/0248440 A1 | 11/2006 | Rhoads et al. | | |
| 2007/0016848 A1 * | 1/2007 | Rosenoff et al. | ............. | 715/501.1 |
| 2008/0082929 A1 * | 4/2008 | Stignani et al. | ............. | 715/764 |
| 2008/0178077 A1 * | 7/2008 | Boucher | ............. | 715/266 |
| 2009/0187567 A1 * | 7/2009 | Rolle | ............. | 707/6 |
| 2010/0005388 A1 * | 1/2010 | Haschart et al. | ............. | 715/256 |
| 2010/0030749 A1 * | 2/2010 | Dahn | ............. | 707/3 |
| 2010/0115401 A1 * | 5/2010 | Nordine et al. | ............. | 715/255 |
| 2010/0332520 A1 * | 12/2010 | Lu et al. | ............. | 707/769 |

OTHER PUBLICATIONS

PCT International Search Report and Written Opinion dated Mar. 2, 2010 for International application No. PCT/US 10/20987 (8 pages).

* cited by examiner

*Primary Examiner* — Weilun Lo
*Assistant Examiner* — Rashedul Hassan
(74) *Attorney, Agent, or Firm* — Finnegan, Henderson, Farabow, Garrett & Dunner, LLP

(57) ABSTRACT

Systems and methods are provided for generating information about a document. In one implementation, a method retrieves a citation from the document in a first database and retrieves the information about the document from a second database. The method also includes converting, by a processor, the information into metadata and generating an icon from the metadata. The icon graphs treatments of the document over time. The method also includes sending the icon for display in response to a query.

23 Claims, 4 Drawing Sheets

DOCUMENT TREATMENT ICON

TECHNICAL FIELD

The present disclosure generally relates to the field of computerized systems and methods. More particularly, systems and methods consistent with disclosed embodiments generate treatment information for a document.

BACKGROUND INFORMATION

Conventional search applications provide a citation list of documents in response to a search query. For example, a user can consider the documents based on their citation (e.g., data identifying a court opinion), and select one the citations in order to view the corresponding document. In addition to the citation, the list may also include a "signal" with each citation. The signal may represent, for example, a treatment of a legal document in the legal community, such as an indication of the treatment of a court's decision. For example, for an appellate level court decision, a red signal that is located next to a case's citation in the list may indicate that the court's decision has been subsequently overturned by the Supreme Court. This signal would thus alert the user that the listed case should not be used by an attorney to characterize precedent in, for example, a legal opinion or brief.

Although a signal provides a snap shot view of the treatment of a court decision, the signal may not supply enough information to accurately determine whether the decision is law that should not be cited. For example, the Supreme Court may have only overturned the decision on one particular issue, while later cases could have relied upon other issues in the listed case as precedent. Indeed, treatment of cases are often more complex and nuanced than indicated by the case signal. Indeed, documents, such as cases and other legal documents, are often treated in multiple instances and in varying manners.

While it would be advantageous for a user to evaluate the entire treatment of the listed document, it is not always practical to do when quickly scanning through query results. Moreover, even if the entire treatment information is readily available, an examination of such information would be burdensome when evaluating a list of citations.

SUMMARY

In accordance with a disclosed embodiment, a method is provided for generating information about a document, the method comprising: retrieving a citation of the document from a first database; retrieving the information about the document from a second database; converting, by a processor, the information into metadata; generating an icon from the metadata, wherein the icon graphs treatment of the document over time; and sending the icon for display in response to a query.

In accordance with another disclosed embodiment, a system is provided for generating information about a document, the system comprising: a citation database storing a citation of the document; a treatment database storing the information about the document; a device to: convert the information into metadata; and generate an icon from the metadata, wherein the icon graphs treatment of the document over time; and a display to display the icon in response to a query.

In accordance with yet another disclosed embodiment, there is provided a computer-readable medium comprising program instructions, which when executed by a processor, cause the processor to perform a method for generating information about a document, the method comprising: retrieving a citation of the document from a first database; retrieving the information about the document from a second database; converting the information into metadata; generating an icon from the metadata, wherein the icon graphs treatment of the document over time; and sending the icon for display in response to a query.

It is to be understood that both the foregoing general description and the following detailed description are exemplary and explanatory only and are not restrictive of embodiments thereof, as claimed.

BRIEF DESCRIPTION OF THE DRAWINGS

The accompanying drawings, which are incorporated in and constitute a part of this specification, illustrate various embodiments. In the drawings.

DETAILED DESCRIPTION

Figure 1:
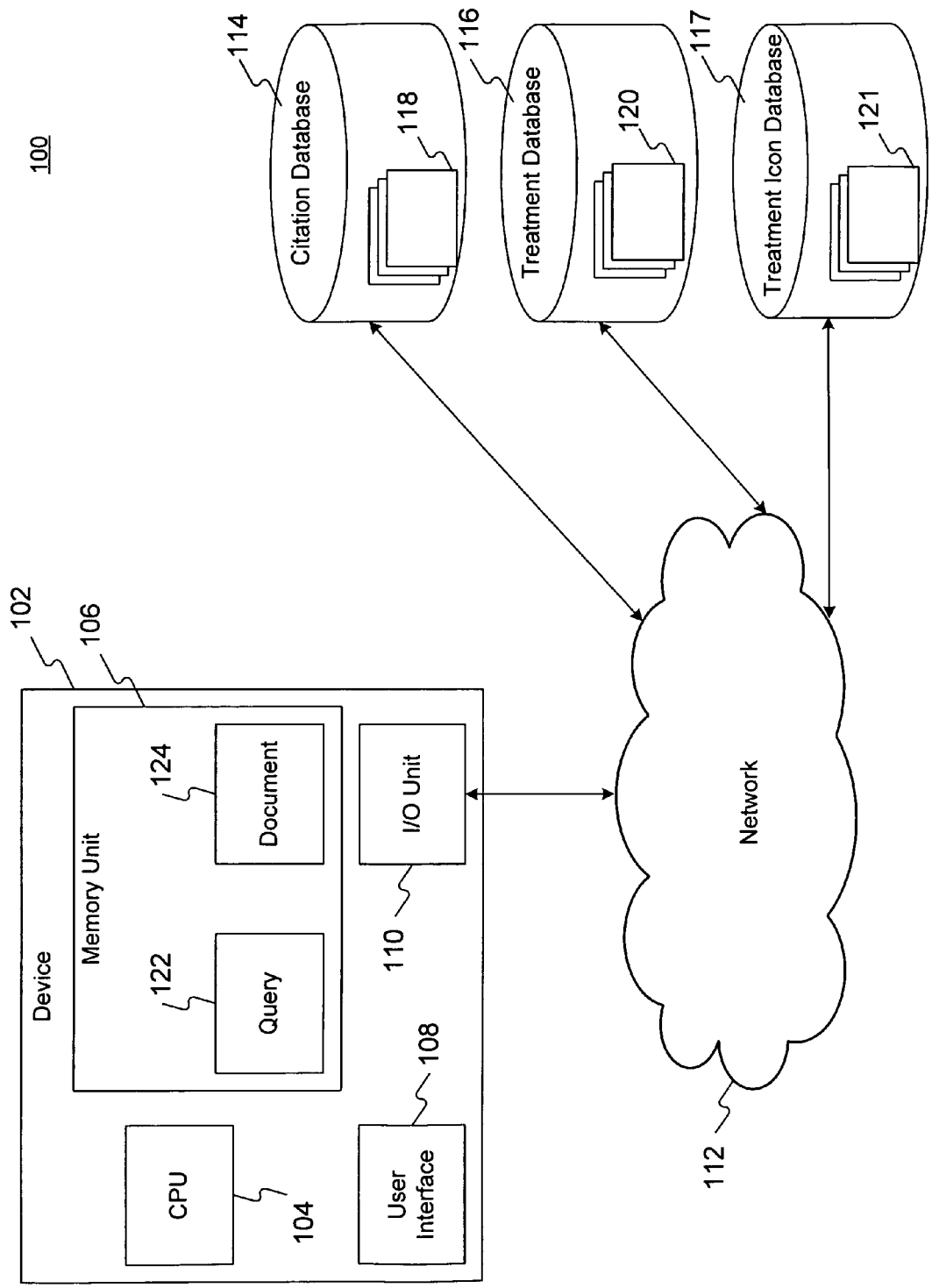
FIG. 1 is an example of a block diagram illustrating a system, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, or adding steps to the disclosed methods. Accordingly, the following detailed description is not limiting of the disclosed embodiments. Instead, the proper scope is defined by the appended claims.

FIG. 1 is an exemplary system 100, consistent with a disclosed embodiment. Although a specific numbers of components are depicted in FIG. 1, any number of these components may be provided. Furthermore, the functions provided by one or more components of system 100 may be combined or separated. Moreover, the functionality of any one or more components of system 100 may be implemented by any appropriate computing environment.

With reference to FIG. 1, system 100 may include device 102 that may be used for performing computing tasks, such as legal research. For example, device 102 may be a desktop computer, laptop computer, or other mobile device. Device 102 may include at least one central processing unit (CPU) 104 configured to execute computer program instructions to perform various processes and methods. CPU 104 may read the computer program instructions from memory unit 106 or from any computer-readable medium. Memory unit 106 may include random access memory (RAM) and/or read only memory (ROM) (not shown) configured to access and store information and computer program instructions. Memory unit 106 may also include additional memory (not shown) to store data and information, and/or one or more internal databases (not shown) to store tables, lists, or other data structures. Device 102 may also include user interface 108 to access user data. In some embodiments, user interface 108 may be separate from device 102. Device 102 may also include I/O unit 110 for accessing data over network 112.

Network 112 facilitates communications between the various devices in system 100, such as device 102, citation database 114, treatment database 116, and treatment icon database 117. In addition, device 102 may access legacy systems (not shown) via network 112, or may directly access legacy systems, databases, or other network applications. Network 112 may be a shared, public, or private network, may encompass a wide area or local area, and may be implemented through any suitable combination of wired and/or wireless communication networks. Furthermore, network 112 may comprise a local area network (LAN), a wide area network (WAN), an intranet, or the Internet.

Citation database 114 may include citation information 118 for documents (not shown). Citation information 118 may include references, pointers, or location information for the documents. Citation database 114 may also include the documents themselves. Treatment database 116 may include information 120 about the documents identified by citation information 118. Information 120 may include treatment information from a Shepard's® database. For example, information 120 may include citations and dates of: cases, opinions, treatises, journal articles, and/or law review articles identified by citation information 118. Information 120 may also include at least one predefined treatment type to describe the manner by which documents identified by citation information 118 were subsequently treated by documents which cite to them (i.e., treatment by "citing documents"). For example, the citing documents may include subsequent court cases, in which a court referenced the cited document, and commented on the subject matter of the cited document. Each predefined treatment type may describe a treatment, such as "positive," "mildly positive," "explaining," or "negative." The treatments may describe a manner in which a subsequent court treated the cited document. There are theoretically no limits as to the number of predefined treatment types that can be used. Moreover, information 120 may include treatment information independent of the Shepard's® database. For example, information 120 may include citations and dates of scientific, financial, political, and/or other subject matter journals or documents associated with citation information 118. One of ordinary skill in the art will recognize that the documents may pertain to any subject and, accordingly, information 120 may pertain to or relate to information that is associated with the documents.

Treatment icon database 117 may include treatment icons 121. Treatment icons 121 may summarize information 120 for a document referenced by citation information 118. Treatment icons 121 may include a limited number of predefined treatment types (e.g., six predefined treatment types).

Furthermore, although citation database 114, treatment database 116, and treatment icon database 117 are shown as single entities, they may each include more than one database, and may be provided in one or more servers, any of which may be combined or distributed. For example, citation database 114, treatment database 116, and treatment icon database 117 may be the same database, or may be distributed across multiple databases. Moreover, although shown as separate components in FIG. 1, citation database 114, treatment database 116, treatment icon database 117, and device 102 may be combined. For example, device 102 may include one or more databases in addition to or instead of citation database 114, treatment database 116, and treatment icon database 117.

Operationally, user interface 108 may receive a query 122 from a user. Alternatively, query 122 may be automatically generated. Device 102 may store query 122 in memory unit 106. Device 102 may send query 122 to citation database 114, treatment database 116, and/or treatment icon database 117 by I/O unit 110 and network 112. Citation database 114 and treatment database 116 may return citation information 118 and information 120, respectively, to device 102 in response to query 122. Alternatively, citation information 118 and information 120 may be returned independent of query 122. For example, citation information 118 and information 120 may be retrieved after an update of citation database 114 or treatment database 116.

Device 102 may generate an icon or chart graphically representing the information 120. Alternatively, device 102 may retrieve treatment icons 121 from treatment icon database 117. Treatment icons 121 may be preprocessed according to information 120 for a document referenced by citation information 118. Treatment icons 121 that are retrieved by device 102 may respond to query 122.

Moreover, device 102 may generate a document 124. Document 124 may include a list of documents that match query 122, along with the icon or the chart reflecting information for the listed documents (e.g., treatment icons 121). Document 124 may be stored in memory unit 106. Document 124 and query 122 may not necessarily be stored in memory unit 106 together, and may both be stored in memory unit 106 at different times. User interface 108 may retrieve document 124 from memory unit 106, and may display document 124 to a user in response to query 122. Document 124 may include a chart and/or icon providing citation information 118 and/or information 120. Alternatively, the chart and/or icon, such as treatment icons 121, may be provided independently of document 124. For example, treatment icons 121 may be provided to other devices or applications via network 112 independent of device 102 and/or query 122.

Figure 2A:
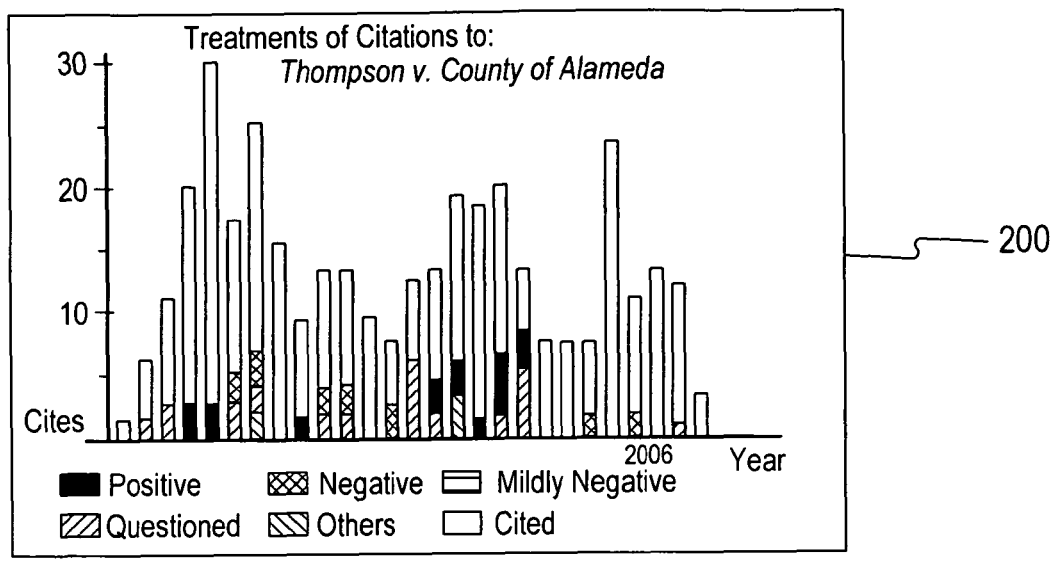
FIG. 2A is an illustration of a chart, consistent with a disclosed embodiment.
Figure 2B:
FIG. 2B is an example of an icon, consistent with a disclosed embodiment.

FIG. 2A illustrates an example of a chart 200 and FIG. 2B illustrates an example of an icon 202. Chart 200 and/or icon 202 may be stored in treatment icon database 117. Chart 200 may include a bar graph, which illustrates the number of citations per year to a cited document. Specifically, chart 200 may show the year on the x-axis, and the number of citations on the y-axis, such that each bar within the bar graph may illustrate the number of citations per year to the cited document. Moreover, each bar in the bar graph may be segmented into predetermined treatment types. The predetermined treatment types shown in chart 200 may include positive, negative, mildly negative, questioned, others, and cited. The inclusions of these predetermined treatment types in the bar graph enables a user to quickly view the manner in which the cited document has been treated over time (e.g., by courts).

Icon 202 is a condensed version of chart 200. Icon 202 may include similar information as chart 200, but is smaller and with less visual detail and clarity. Accordingly, icon 202 may be displayed with the citation information in the displayed document responsive to the query. Icon 202 may be displayed when a smaller image is desirable. For example, icon 202 may be displayed when space or a display area is limited. If a user needs further detail, the use may select icon 202 to display chart 200. Moreover, chart 200 may be interactive, for example, by permitting filtering of displayed data of chart 200. For example, filtering may cause chart 200 to display a filtered subset of the displayed data upon selection of chart 200. Moreover, chart 200 may enable a user to select an area of chart 200 to invoke a jurisdictional trigger. For example, a jurisdictional trigger may remove cases from chart 200 that are not from a specified legal jurisdiction. Moreover, a user may select a portion of chart 200, such as a segment of the bar graph, to view documents associated with the selected portion. For example, a user may select a portion of the bar graph in FIG. 2A for year 2006 that corresponds to cases that are treated negatively. Upon the selection, the user may view actual documents from 2006 that were treated negatively.

By using chart 200 and icon 202, a user can quickly determine and analyze nuanced treatment data for the cited document, e.g. a legal document. This can assist the user in quickly determining whether, for example, the legal document reflects law which should be cited, or law which should not be cited.

Figure 3:
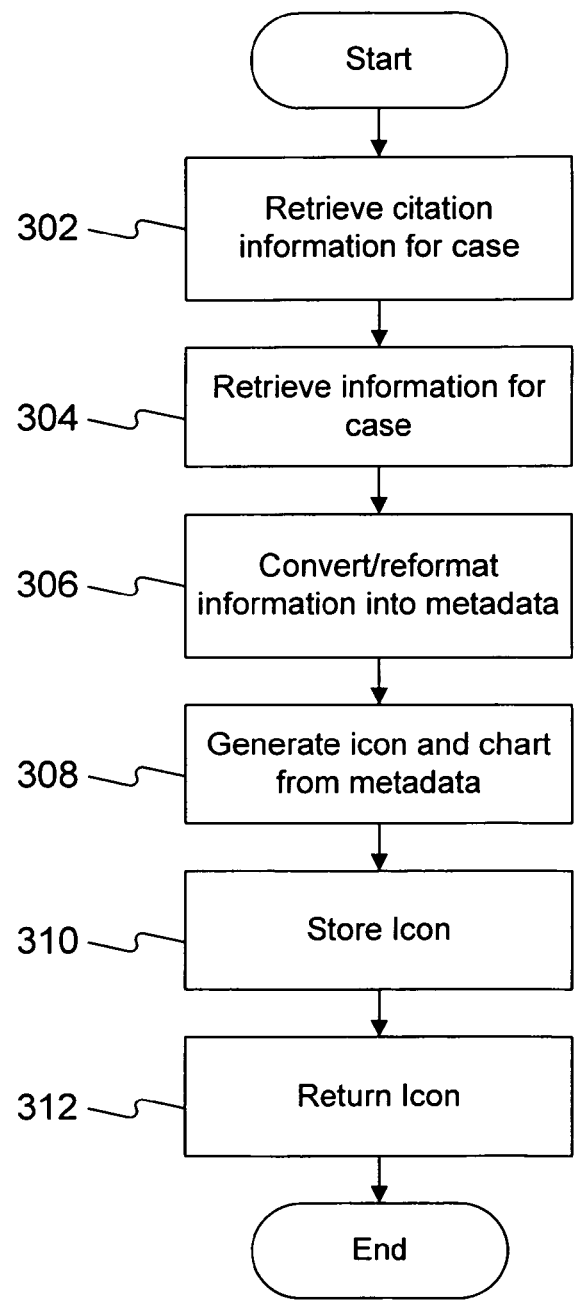
FIG. 3 is an example of a flow chart for a method for generating treatment information for a document, consistent with a disclosed embodiment.

FIG. 3 includes exemplary method 300 which may be used for generating a preprocessed icon 202 and/or chart 200 consistent with disclosed embodiments. Method 300 may be executed by device 102, alone or in conjunction with other devices. For example, in executing method 300, device 102 may access citation database 114, treatment database 116, treatment icon database 117, and/or any other component available via network 112.

In block 302, device 102 may retrieve citation information 118 for a cited document. Next, at block 304, device 102 may retrieve information 120 about the cited document from treatment database 116. The information 120 may refer to citing documents, which cite to the cited document. The citing documents may treat the citing document in a particular manner. The citing documents may describe a subsequent treatment of the citing document by a court.

At block 306, device 102 may convert the information 120 into metadata. For example, device 102 may reformat the information 120 for use in the metadata. Because the information 120 may describe a manner in which citing documents treat the cited document, the information 120 may include a date, citation, and a predefined treatment type for the citing documents. Reformatting in block 306 may include formatting information 120 of each individual citing case onto a single line in the metadata. Each line of the metadata may correspond to a single citing document. Each line of the metadata may describe information 120 of a single citing document. The metadata may comprise a delimited text file. A delimited text file may include sections of text that are separated by any sequence of characters or blank space.

Device 102 may add the predetermined treatment types from the information 120 to the metadata during the converting in block 306. Accordingly, the converting may also include reducing the number of predetermined treatment types added to the metadata, by aggregating similar predetermined treatment types from the information 120. For example, the treatment types "mildly positive" and "somewhat positive," may both exist in the information 120 as different degrees of positive treatment by the individual citing documents towards the cited document. These treatment types may be combined into "mildly positive" for use in the metadata, so that the metadata includes fewer predefined treatment types than the information 120.

In block 308, device 102 may use the metadata to generate an icon and a chart, such as icon 202 and chart 200. The icon and the chart may each graph the treatment information for the cited document. In other words, the icon and the chart may display the manner in which the citing documents treat the cited document, for example, over time. The chart is larger than the icon, and is clearer by including more visible detail. The chart and the icon may be linked together. For example, a pointer to the chart may be embedded within the icon. A selection of the icon may activate the embedded pointer and cause the linked chart to become visible and/or interactive.

Moreover, each line of the metadata may correspond to one of the citing documents. Therefore, in some embodiments, each line of the metadata is individually parsed to gather information for each of the citing documents, and this information is then added to the graphs in the icon and the chart.

At block 310, device 102 may store the icon and/or the chart for retrieval by various user applications. For example, the icon and/or the chart may be stored by treatment icon database 117. Alternatively, the icon and/or the chart may be stored in citation database 114, treatment database 116, device 102, or elsewhere. The icon and the chart may be portable, and therefore, may be stored anywhere.

In block 312, device 102 may receive the icon and/or chart. Treatment icon database 117 may send additional preprocessed icons and/or charts to device 102. Device 102 may insert the icons and/or charts as entries in a display document. The display document may be generated and displayed to a user in response to a query. The display document may include, for example, a document or case list. The case list may include a list of cases, and corresponding icons and/or charts, that meet the query. This enables a user to view the citation information and condensed treatment information (as the icon), for the cited documents that match the query. In this way, the user may be able to view detailed treatment information for the cited documents quickly.

Although blocks 302-312 have been described above as being separate ordered steps, one of ordinary skill in the art will recognize that functionalities provided the blocks may be combined, omitted, and performed in any order.

As discussed previously, the icon and the chart may be preprocessed. However, in some embodiments, the icon and the chart may be generated in real-time. For example, the icon and the chart may be generated upon receiving the query. The icon and the chart may be generated in real-time in response to the query by device 102.

Figure 4:
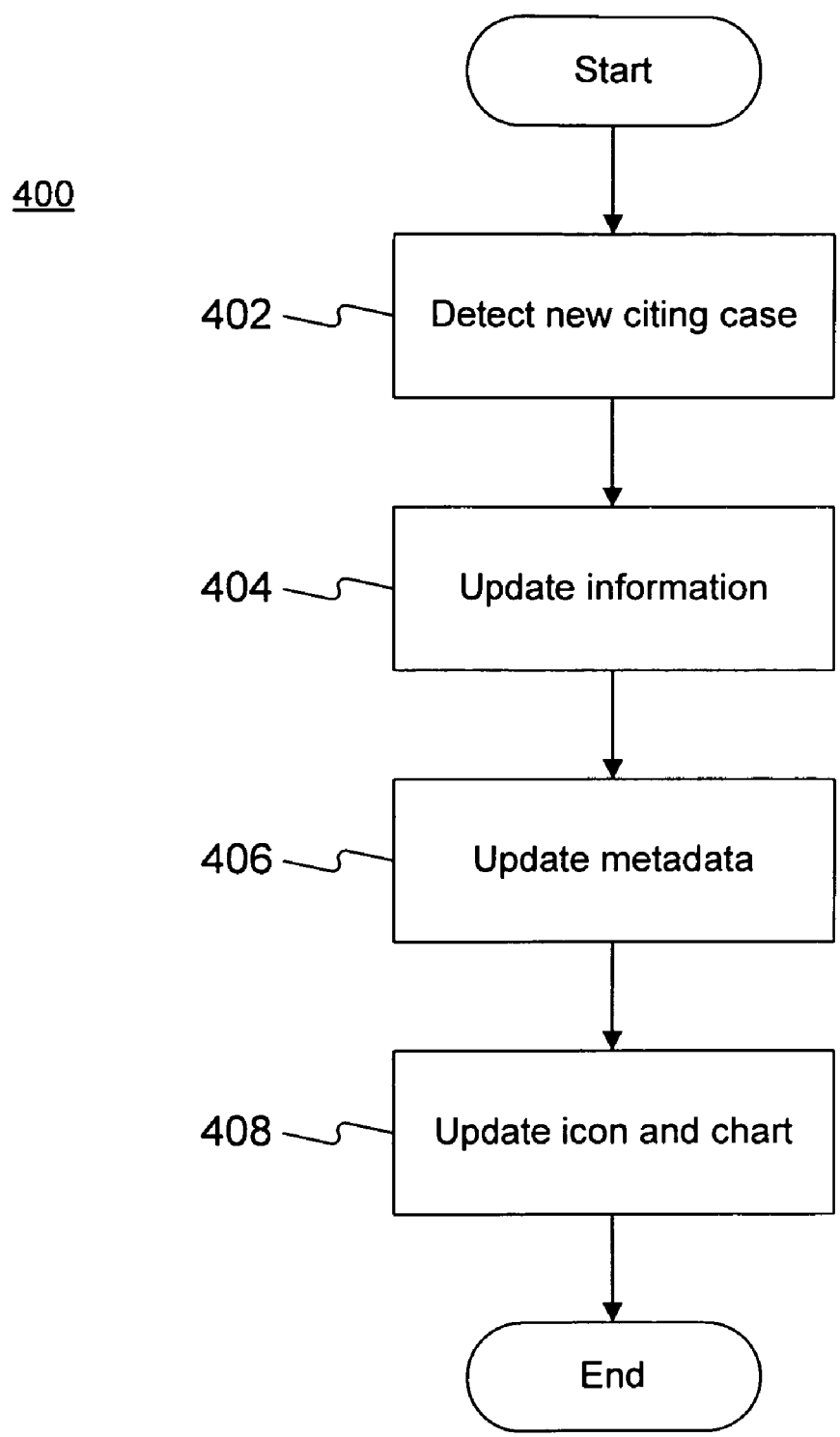
FIG. 4 is an example of a flow chart illustrating an updating process, consistent with a disclosed embodiment.

FIG. 4 is an example of a flow chart of a method 400 for an updating process in which the icon and the chart are preprocessed. Method 400 may be executed by device 102, alone or in conjunction with other devices. For example, in executing method 400, device 102 may access citation database 114, treatment database 116, treatment icon database 117, and/or any other component available via network 112.

In block 402, device 102 may detect a new citing document. The new citing document may cite to any cited document, and therefore, may include relevant information 120 about the cited document. In block 404, device 102 may cause the information 120 of the cited document to be updated in the treatment database 116 to reflect the relevant treatment information from the new citing document.

In block 406, device 102 may locate and then update the metadata to reflect the updated information. In some embodiments, instead of updating the metadata, device 102 may generate new metadata.

In block 408, device 102 may locate and update the icon and the chart according to the updated/new metadata. In some disclosed embodiments, instead of updating the icon and the chart, device 102 may generate a new icon and chart.

Although blocks 402-408 have been described above as being separate ordered steps, one of ordinary skill in the art will recognize that functionalities provided the blocks may be combined, omitted, and performed in any order.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of Net Framework, Net Compact Framework (and related languages, such as Visual Basic, C, etc.), Java, C++, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A method for generating information about a document, the method comprising:
   retrieving a citation of the document from a first database;
   retrieving the information about the document from a second database;
   converting, by a processor, the information into metadata;
   generating an icon from the metadata, wherein the icon includes a plurality of time periods and graphs a number of times the document is treated a particular way over the time periods; and
   sending the icon for display in response to a query.

2. The method of claim 1, wherein the information includes:
   treatment information;
   information identifying citing documents that cite to the document; and
   treatment types reflecting the treatment of the document by the citing documents.

3. The method of claim 2, wherein:
   the converting further comprises:
      reducing a number of the treatment types by aggregating at least two of the treatment types together; and
      reformatting the information into the metadata; and
   the generating further comprises parsing the metadata.

4. The method of claim 3, wherein the reduced treatment types comprise at least one of: positive, negative, mildly negative, questioned, others, or cited.

5. The method of claim 1, further comprising:
   detecting a new document in the first database;
   generating an update based on the new document;
   updating the information in the second database according to the update;
   updating the metadata according to the update; and
   updating the icon according to the update.

6. The method of claim 1, further comprising:
   generating a chart from the metadata, wherein the chart is larger and includes more detail than the icon; and
   creating a link between the icon and the chart.

7. The method of claim 6, further comprising:
   receiving a user selection of the icon;
   accessing the chart by using the link; and
   displaying the accessed chart in response to the user selection.

8. The method of claim 6, further comprising:
   storing the icon and the chart in a third database; and
   associating the stored icon and chart with the document.

9. The method of claim 1, wherein the document is a legal document.

10. A system for generating information about a document, the system comprising:
    a citation database storing a citation of the document;
    a treatment database storing the information about the document;
    a device to:
       convert the information into metadata; and
       generate an icon from the metadata, wherein the icon includes a plurality of time periods and graphs a number of times the document is treated a particular way over the time periods; and
    a display to display the icon in response to a query.

11. The system of claim 10, wherein the information includes:
    treatment information;
    information identifying citing documents that cite to the document; and
    treatment types reflecting the treatment of the document by the citing documents.

12. The system of claim 11, further wherein the device further:
    reduces a number of the treatment types by aggregating at least two of the treatment types together;
    reformats the information into the metadata; and
    parses the metadata.

13. The system of claim 12, wherein the reduced treatment types comprise at least one of: positive, negative, mildly negative, questioned, others, or cited.

14. The system of claim 10, further wherein:
    the citation database receives a new document; and
    the device further:
    generates an update based on the new document;
    updates the information in the treatment database according to the update;
    updates the metadata according to the update; and
    updates the icon according to the update.

15. The system of claim 10, wherein the device further:
    generates a chart from the metadata, wherein the chart is larger and includes more detail than the icon; and
    creates a link between the icon and the chart.

16. The system of claim 15, wherein the device further receives a user selection of the icon and accesses the chart by using the link, and wherein the display further displays the accessed chart in response to the user selection.

17. The system of claim 15, further comprising:
a treatment icon database that stores the icon and the chart, and associates the stored icon and chart with the document.

18. The system of claim 10, wherein the document is a legal document.

19. A computer-readable medium comprising program instructions, which when executed by a processor, cause the processor to perform a method for generating information about a document, the method comprising:
retrieving a citation of the document from a first database;
retrieving the information about the document from a second database;
converting the information into metadata;
generating an icon from the metadata, wherein the icon includes a plurality of time periods and graphs a number of times the document is treated a particular way over the time periods; and
sending the icon for display in response to a query.

20. The computer-readable medium of claim 19, wherein:
the information includes treatment information, information identifying citing documents that cite to the document, and treatment types for the citing documents, the treatment types reflecting the treatment of the document by the citing documents;
the converting further comprises reducing the number of treatment types by aggregating at least two of the treatment types together, the reduced treatment types comprising at least one of: positive, negative, mildly negative, questioned, others, or cited, and further comprising reformatting the information into the metadata; and
the generating further comprises parsing the metadata.

21. The computer-readable medium of claim 19, the method further comprising:
detecting a new document in the first database;
generating an update based on the new document;
updating the information in the second database according to the update;
updating the metadata according to the update; and
updating the icon according to the update.

22. The computer-readable medium of claim 19, further comprising:
generating a chart from the metadata, wherein the chart is larger and includes more detail than the icon;
storing the icon and the chart in a third database;
creating a link between the icon and the chart;
associating the stored icon and chart with the document;
receiving a user selection of the icon;
accessing the chart by using the link;
displaying the accessed chart in response to the user selection.

23. The computer-readable medium of claim 19, wherein the document is a legal document.

\* \* \* \* \*